Figure 1:
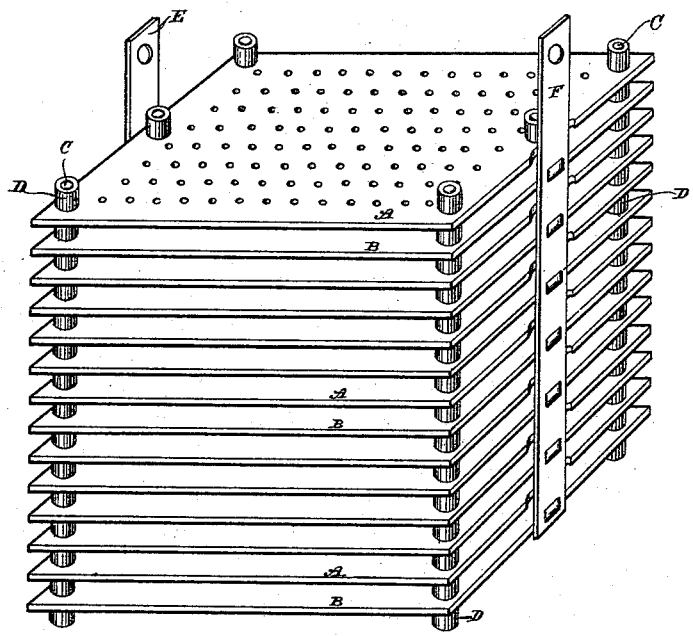

(No Model.)

C. D. P. GIBSON.
METHOD OF AND APPARATUS FOR PREPARING ELECTRODES FOR SECONDARY BATTERIES.

No. 439,240. Patented Oct. 28, 1890.

Witnesses:
Raphael Netter
R. B. Murphy

Inventor
Charles D. P. Gibson
by
Duncan, Curtis & Page
Attorneys.

THE NORRIS PETERS CO., PHOTO-LITHO., WASHINGTON, D. C.

UNITED STATES PATENT OFFICE.

CHARLES D. P. GIBSON, OF JERSEY CITY, NEW JERSEY.

METHOD OF AND APPARATUS FOR PREPARING ELECTRODES FOR SECONDARY BATTERIES.

SPECIFICATION forming part of Letters Patent No. 439,240, dated October 28, 1890.

Application filed March 8, 1890. Serial No. 343,197. (No model.)

*To all whom it may concern:*

Be it known that I, CHARLES D. P. GIBSON, a citizen of the United States, residing at Jersey City, in the county of Hudson and State of New Jersey, have invented a certain new and useful Method of and Apparatus for Preparing the Plates or Electrodes for Storage-Batteries, of which the following is a specification, reference being had to the drawings accompanying and forming a part of the same.

This invention is an improvement in the art of preparing and forming the plates or electrodes for secondary or storage batteries, the object of which is to provide a means for permanently associating with a frame or holder an active material—such as minium, red lead, or litharge—and treating or forming the same to render it available for use in an operative battery.

My primary object is to utilize the oxides of lead named above or their equivalents in their most available or easily-obtainable condition of dry powder; but the invention is broadly applicable to the treatment of other substances and the above-named substances in any form. Heretofore no practicable process or plan has been proposed, so far as I am aware, by which the dry powder can be economically used, for in whatever way it may be associated with a lead or other frame it has such a strong tendency to dissolve and disintegrate in the electrolyte in which the plates are immersed for treatment or forming that the advantages secured by the use of the dry powder are more than offset by the waste of material and deterioration of the electrodes as a whole which prior processes for this purpose would seem to necessarily involve. According to my present invention, however, I prepare a rack or a series of shelves which constitute a device containing the principle of construction of an ordinary Planté battery, the shelves being of lead and secured together, but insulated, and alternately connected to terminals by means of which the charging-current is conveyed to them. This rack is adapted to be immersed in a solution or electrolyte, the shelves being horizontal and preferably perforated. I use this device in carrying out my invention by placing on each shelf or plate one or more plates or grids of lead or equivalent metal with which the desired oxide has been associated. The rack with its load of plates is then immersed in the electrolyte and the current started through it before the oxide has had an opportunity to dissolve off or fall away to any material degree from the plates. The effect of the current is to fix and harden the oxide, converting that in the plates on the positive shelves into peroxide of lead and that in the others into spongy lead. When the plates have thus been treated a proper length of time, they may be removed from the shelves, washed, and dried, and afterward assembled in batteries in any desired manner and number. The invention involves, therefore, the method or process of fixing or forming the active material by lowering the plates on horizontal conducting-shelves into an electrolyte and passing the charging-current through them and the shelves, and, secondly, the rack or series of shelves adapted to this purpose.

In detail the invention is illustrated in the accompanying drawings.

Figure 2:
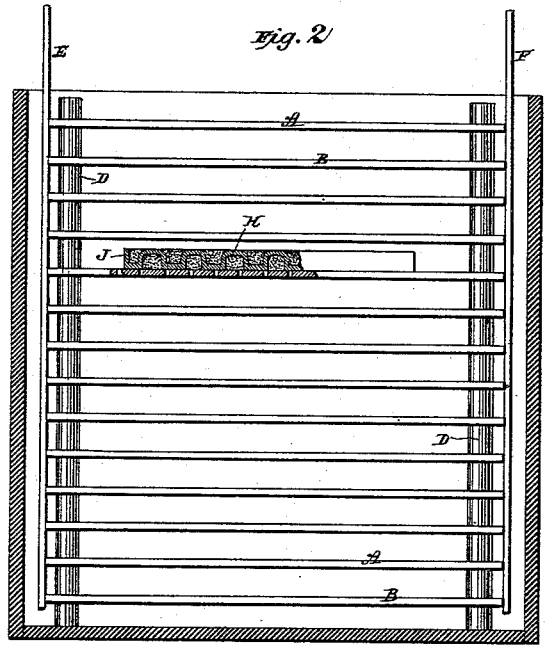

Figure 1 is a perspective view of the forming-rack, and Fig. 2 is a vertical section of the same immersed in the solution.

The device which I designate the "rack" is built up of any desired number of lead or similar plates A B, held in position by insulated rods C, passing through perforations near the corners and end edges of the plates, and by insulating-washers D, strung on said rods between adjacent plates. The plates or shelves are alternately connected on opposite sides to conducting-strips E F, all of the shelves A being thus brought into electrical connection with strip E and the remaining shelves with strip F. The two strips E F should be insulated in order that the current may all pass from shelf to shelf, and they may be of sufficient strength to form handles by means of which the rack is immersed in and raised from the electrolyte. The shelves are perforated, as shown, or made in other ways; but it will be seen that in principle of construction the rack as a whole resembles a true Planté battery with alternately positive and negative plates.

I prefer to use as the plates to receive the oxide a frame or grid substantially like that shown in my patent, No. 397,796, dated February 12, 1889, and composed of a sheet of metal, preferably lead, from the surface of which loops H are struck up to a height about equal to that of the rim J. As many of these plates or grids as desired are placed on a flat surface, and red oxide of lead or litharge, according to whether the plate is to be positive or negative, is rubbed with the hand or otherwise into the openings on both sides of the same. The red-oxide plates are then placed on the positive shelves of the forming or curing rack and the litharge plates on the negative shelves, and the whole is then carefully immersed in an electrolyte composed of sulphuric acid and water and a current directed through them until the plates are "formed." They are then removed, washed, and dried, and are then ready to assemble or ship commercially. Plates formed or cured in this way are of superior quality. The process enables the manufacturer to reject all imperfect plates and to make cheaply and economically any quantity of single or separate plates of uniform quality.

I would not be understood as limiting myself herein to any particular oxide or active material, nor to any special form of lead plate or frame, nor to the special construction of the rack which is shown.

What I claim is—

1. The method or process of manufacturing secondary-battary plates, which consists in associating with metal plates or holders an active material or oxide and then immersing said plates on conducting-shelves into an electrolyte, and connecting said shelves to a source of current, substantially as set forth.

2. The method or process of manufacturing secondary-battery plates, which consists in filling perforations or openings in lead plates with lead oxide in the condition of a dry powder, immersing said plates on conducting shelves or plates into an electrolyte, and passing a current from shelf to shelf through the said plates and the intervening electrolyte, as set forth.

3. An apparatus for forming or curing secondary-battery plates, consisting of a rack or series of conducting-shelves insulated from one another and adapted to receive and support the plates to be formed, the said shelves being alternately connected to opposite terminals, as herein set forth.

4. A secondary-battery apparatus consisting of a rack or series of conducting shelves or plates insulated from one another and alternately connected to opposite binding-posts or terminals, in combination with grids or frames filled with lead oxide and forming the plates of a secondary battery, as set forth.

In witness whereof I have hereunto set my hand this 15th day of February, 1890.

CHAS. D. P. GIBSON.

Witnesses:
PARKER W. PAGE,
FRANK B. MURPHY.